(12) United States Patent
Dussillols et al.

(10) Patent No.: US 7,827,802 B2
(45) Date of Patent: Nov. 9, 2010

(54) VARIABLE-SECTION FLOW MIXER FOR A DOUBLE-FLOW TURBOJET FOR A SUPERSONIC AIRPLANE

(75) Inventors: Laurent Christophe Dussillols, Melun (FR); Olivier Roland Longeville, Bourg-la-Reine (FR); Alexandre Alfred Gaston Vuillemin, Fontainebleau (FR)

(73) Assignee: SNECMA, Paris (FR)

( * ) Notice: Subject to any disclaimer, the term of this patent is extended or adjusted under 35 U.S.C. 154(b) by 364 days.

(21) Appl. No.: 12/020,242

(22) Filed: Jan. 25, 2008

(65) Prior Publication Data

US 2008/0236167 A1    Oct. 2, 2008

(30) Foreign Application Priority Data

Jan. 26, 2007    (FR)    ................... 07 52903

(51) Int. Cl.
  *F02K 1/00*    (2006.01)
(52) U.S. Cl. ............... 60/770; 181/213; 239/265.13
(58) Field of Classification Search .......... 60/770, 60/771, 226.1, 262, 39.5; 239/265.13, 265.17; 181/213, 220
  See application file for complete search history.

(56) References Cited

U.S. PATENT DOCUMENTS

| | | | | | |
|---|---|---|---|---|---|
| 3,409,228 | A | * | 11/1968 | Mehr | ................. 239/127.3 |
| 3,612,209 | A | * | 10/1971 | Vdoviak et al. | .............. 60/232 |
| 3,695,387 | A | * | 10/1972 | Hilbig | ....................... 181/219 |
| 4,052,847 | A | * | 10/1977 | Rodgers et al. | .............. 60/262 |
| 4,285,194 | A | * | 8/1981 | Nash | ............................ 60/762 |
| 4,501,393 | A | * | 2/1985 | Klees et al. | ............ 239/265.13 |
| 4,909,346 | A | * | 3/1990 | Torkelson | ................... 181/213 |
| 4,958,489 | A | * | 9/1990 | Simmons | ................. 60/226.3 |
| 5,291,672 | A | * | 3/1994 | Brown | .......................... 60/262 |
| 5,761,899 | A | * | 6/1998 | Klees | ........................... 60/204 |
| 5,779,150 | A | * | 7/1998 | Lidstone et al. | ........ 239/265.13 |
| 5,826,794 | A | * | 10/1998 | Rudolph | ................ 239/265.17 |
| 5,884,472 | A | * | 3/1999 | Presz et al. | .................... 60/262 |
| 5,884,843 | A | | 3/1999 | Lidstone et al. | |
| 5,908,159 | A | * | 6/1999 | Rudolph | ................ 239/265.17 |
| 6,050,527 | A | * | 4/2000 | Hebert et al. | ............... 244/210 |

(Continued)

FOREIGN PATENT DOCUMENTS

EP    1 482 160 A1    12/2004

(Continued)

*Primary Examiner*—William H Rodriguez
(74) *Attorney, Agent, or Firm*—Oblon, Spivak, McClelland, Maier & Neustadt, L.L.P.

(57) ABSTRACT

The invention relates to a variable-section flow mixer for a double-flow turbojet for a supersonic airplane, the mixer comprising a central body, a primary cover, a secondary cover, and a nozzle extending the secondary cover. The nozzle has a plurality of external-air admission openings having mounted therein lobes that are movable between two positions: a closed position in which they close the openings; and a deployed position in which they disengage said openings and deploy into the nozzle so as to allow external air to be admitted. All of the lobes present a common azimuth component in a common direction, and the mixer further includes a plurality of longitudinal grooves occupying at least a portion of the central body, all of the grooves presenting a common azimuth component in a common direction that is opposite to the direction of the azimuth component of the lobes.

6 Claims, 3 Drawing Sheets

U.S. PATENT DOCUMENTS

| | | | |
|---|---|---|---|
| 6,935,098 B2 * | 8/2005 | Bardagi et al. | 60/262 |
| 2007/0163230 A1 | 7/2007 | Dussillols et al. | |
| 2008/0236167 A1 * | 10/2008 | Dussillols et al. | 60/771 |

FOREIGN PATENT DOCUMENTS

| | | |
|---|---|---|
| FR | 2 896 274 A1 | 7/2007 |
| GB | 2 123 486 A | 2/1984 |
| WO | WO 00/40851 | 7/2000 |

* cited by examiner

VARIABLE-SECTION FLOW MIXER FOR A DOUBLE-FLOW TURBOJET FOR A SUPERSONIC AIRPLANE

BACKGROUND OF THE INVENTION

The present invention relates to the general field of variable-section flow mixers for double-flow turbojets with a low bypass ratio for supersonic airplanes.

The low bypass ratio double-flow turbojet for a supersonic airplane essentially comprises a double-flow gas generator (generating a cold flow and a hot flow), extended by a nozzle that defines a gas ejection channel.

Low bypass ratio double-flow turbojets for fitting to supersonic airplanes for use in civilian transport need to comply with two requirements: firstly they must present as little drag as possible during stages of transonic and supersonic cruising flight; and secondly they must present acceptable levels of noise on airplane takeoff, with certification authorities having increasingly more stringent requirements with respect to the emission of noise from the turbojets of civil airplanes.

Unfortunately, those two requirements are contradictory. The first requirement leads to turbojet designs of small diameter, while the second requirement needs thrust to be increased by increasing the mass flow rate of gas, thereby leading to large fan diameters (and thus to large turbojet diameters).

One known solution for complying with those requirements is to make use of a variable-section flow mixer. Such a mixer makes it possible during airplane takeoff stages to introduce into the turbojet a flow of air that is external to the turbojet in order to be mixed with the flow of gas coming from the gas generator. The mixer for mixing external air with the gas flow coming from the gas generator serves to increase the total mass flow rate of gas that is produced by the turbojet. Thus, at constant thrust, the speed at which the gas is ejected can be reduced compared with a double-flow turbojet that does not have a mixer. Since jet noise increases with gas ejection speed, this reduction in speed leads to a large decrease in noise level on takeoff.

In practice, the external air is introduced into the turbojet downstream from the gas generator via openings that are distributed around the entire circumference of the nozzle. The air introduced in this way mixes with the gas flow coming from the gas generator with the help of guides that extend radially across the gas flow ejection channel. Those guides are movable between a position in which they disengage the openings and enable mixing to take place (during airplane takeoff stages), and another position in which they obstruct the openings for other stages of flight.

Although satisfactory, that solution presents the drawback of requiring the turbojet to be lengthened considerably in order to encourage mixing between the external air flow and the gas flow coming from the gas generator. Unfortunately, the turbojet can be lengthened only to the detriment of its weight. Furthermore, it is generally necessary to have recourse to acoustic lagging on the inside wall of the ejection nozzle of the turbojet so as to absorb the most troublesome sound frequencies.

A mixer is also known from French patent application No. 06/50127 (published under FR 2,896,274) filed by the Applicant, in which the guides are lobes, all presenting an azimuth component in the same direction so as to impart gyratory motion to the external air admitted into the turbojet when the lobes are in their open position.

Although effective in reducing the jet noise level of turbojet on takeoff in compact manner, that solution nevertheless leads to a loss of thrust due to the gyration of the external air that is introduced into the turbojet when the lobes are in their open position.

OBJECT AND SUMMARY OF THE INVENTION

A main object of the present invention is thus to mitigate such drawbacks by proposing a variable-section flow mixer that enables the jet noise level from the turbojet during takeoff to be decreased in a compact manner and without thereby decreasing the thrust from the turbojet.

This object is achieved by a variable-section flow mixer for a double-flow turbojet for a supersonic airplane, the mixer comprising: a central annular body about a longitudinal axis; a primary annular cover coaxially surrounding the central body to co-operate therewith to define a primary annular channel; a secondary annular cover coaxially surrounding the primary cover to co-operate therewith to define a secondary annular channel coaxial with the primary channel; and an annular nozzle centered on the longitudinal axis and placed longitudinally in line with the secondary cover, the nozzle having a plurality of external-air admission openings distributed around its entire circumference, opening out into a convergence zone between the flows coming from the primary and secondary channels, and within which lobes are mounted that are movable between two different positions: a closed position in which they obstruct the nozzle openings; and a deployed position in which they disengage said openings and deploy radially into the nozzle so as to enable external air to be admitted into the convergence zone; the lobes all presenting a common azimuth component in a common direction so as to impart gyratory motion to the external air that is admitted into the convergence zone when the lobes are in the second position; the mixer further comprising a plurality of longitudinal grooves occupying at least a portion of the central body, the grooves all presenting a common azimuth component in a common direction that is opposite to the direction of the azimuth component of the lobes.

The use of lobes having an azimuth component encourages mixing between the flow of air external to the turbojet and the flow of gas coming from the primary and secondary channels considerably by imparting gyratory motion to the external air. The presence of grooves in the central body further increases this mixing between the gas flows. In addition, all the grooves present an azimuth component in a direction opposite to that of the lobes, thereby enabling the flow of air set into gyration by the lobes to be "straightened out" by swirling it in the opposite direction. As a result, the thrust from the turbojet is not affected by the effect of the gyration imparted by the azimuth component of the mixer lobes.

Advantageously, the mixer has as many grooves as lobes.

Preferably, the azimuth component of the grooves is identical in magnitude to that of the lobes.

The invention also provides a turbojet for a supersonic airplane, the turbojet including a variable-section flow mixer as defined above.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF AN EMBODIMENT

Figure 1:
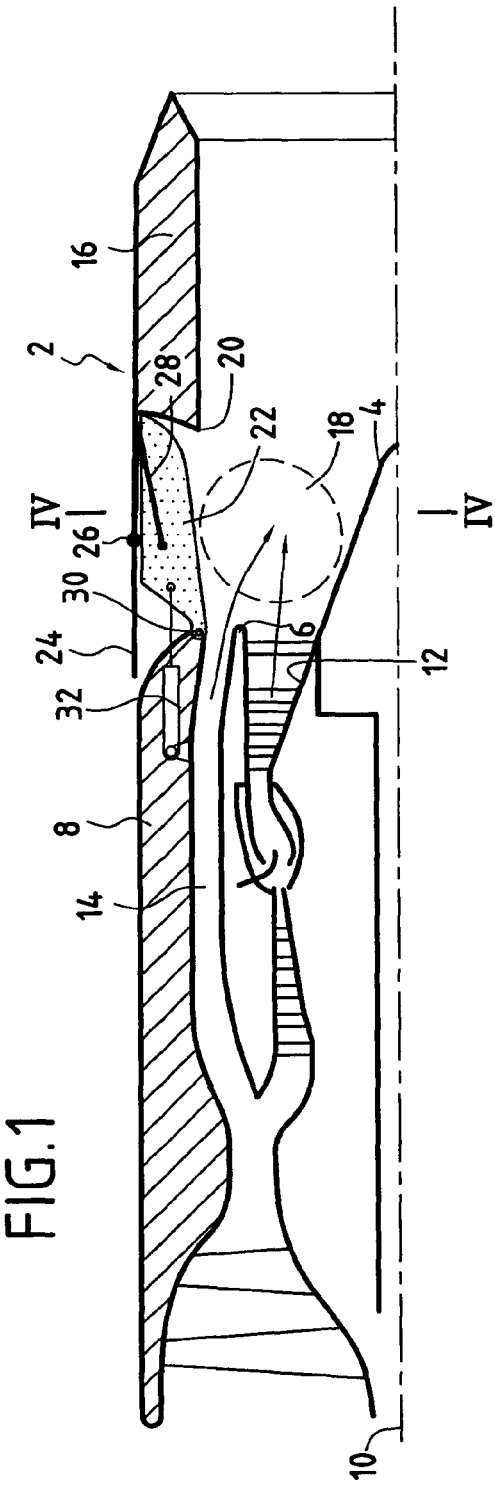
FIGS. 1 and 2 are diagrammatic half-views in longitudinal section showing a turbojet fitted with a mixer of the invention shown in its closed and its deployed positions.

FIGS. 1 to 6 show a variable-section flow mixer of the invention. The mixer is intended in particular for fitting to a double-flow turbojet with a low bypass ratio for a supersonic airplane.

The mixer 2 mainly comprises a central annular body 4, a primary annular cover 6, and a secondary annular cover 8, all of these elements being centered on a longitudinal axis 10 of the turbojet.

The primary cover 6 surrounds the central body 4 coaxially so as to co-operate therewith to define a primary annular channel 12 for passing a hot gas flow coming from the turbojet.

The secondary cover 8 surrounds the primary cover 6 coaxially so as to co-operate therewith to define a secondary annular channel 14 coaxial about the primary channel and serving to pass a flow of cold air coming from the turbojet.

The mixer also includes an annular nozzle 16 for ejecting gas that is centered on the longitudinal axis 10 and placed longitudinally in line with the secondary cover 8. The cold and hot flows coming from the turbojet mix inside this nozzle 16 in a convergence zone 18 (FIG. 1).

The nozzle 16 has a plurality of longitudinal openings 20 for admitting external air, which openings are distributed (preferably regularly) all around its circumference. These openings 20 open to the outside of the turbojet and lead into the nozzle substantially in the convergence zone 18 between the cold and hot flows.

It should be observed that the central body 4 of the turbojet extends longitudinally inside the nozzle beyond the primary and secondary covers 6 and 8 so that the openings 20 open out substantially facing the central body.

In each of the openings 20 there is mounted an air guide 22 in the form of a channel-section lobe that is movable between two different positions: a first position (FIGS. 1, 3, and 4) referred to as a "closed" position, in which the lobe obstructs the corresponding opening; and a second position (FIGS. 2 and 6) referred to as a "deployed" position, in which the lobe uncovers the corresponding opening and deploys radially inside the nozzle 16.

The closed position of the lobes 22 corresponds to all flight stages of the supersonic airplane fitted with the turbojet, with the exception of takeoff stages (e.g. it corresponds to stages of supersonic cruising flight). In this position, the lobes are retracted into the structure of the nozzle 16 so as to obstruct the openings 20. As a result, no air external to the turbojet is admitted into the nozzle.

The deployed position of the lobes 22 corresponds to stages during which the supersonic airplane fitted with the turbojet is taking off. In this position, the lobes are deployed so as to extend radially across the ejection channel formed by the nozzle (the axis of each lobe is thus inclined relative to the longitudinal axis 10). They thus act as guides to enable air that is external to the turbojet to penetrate into the nozzle 16 via the openings 20 in order to become mixed with the cold and hot flows. By means of this additional external air, the flow rate of gas produced by the turbojet is increased while the airplane is taking off.

Figure 2:
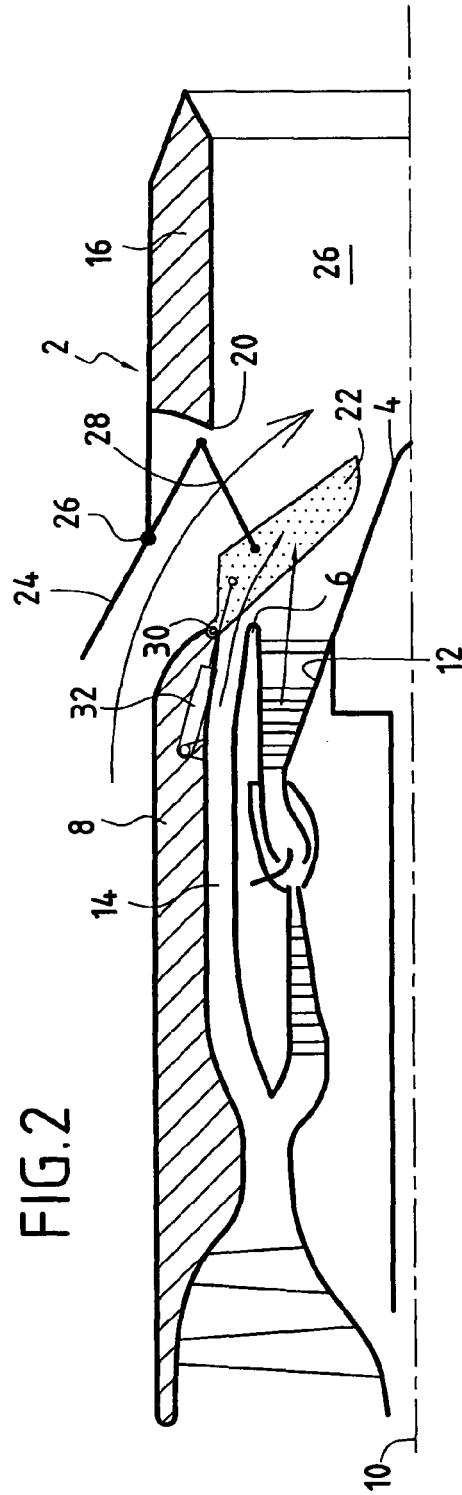

As shown in FIGS. 1 and 2, in each of the external-air admission openings 20 there is also mounted a scoop 24 suitable for pivoting about a stationary pivot 26. Each scoop 24 is also connected by a link 28 to the lobe 22 corresponding to the external-air admission opening.

Thus, when the lobes 22 deploy into the open position (FIG. 2), the scoop 24 pivots together with the lobes to enable external air to be admitted into the nozzle. Likewise, when the lobes are closed (FIG. 1), the scoops pivot in the opposite direction together with the lobes and mask the openings 20, thus preventing external air being admitted into the nozzle.

Figure 3:
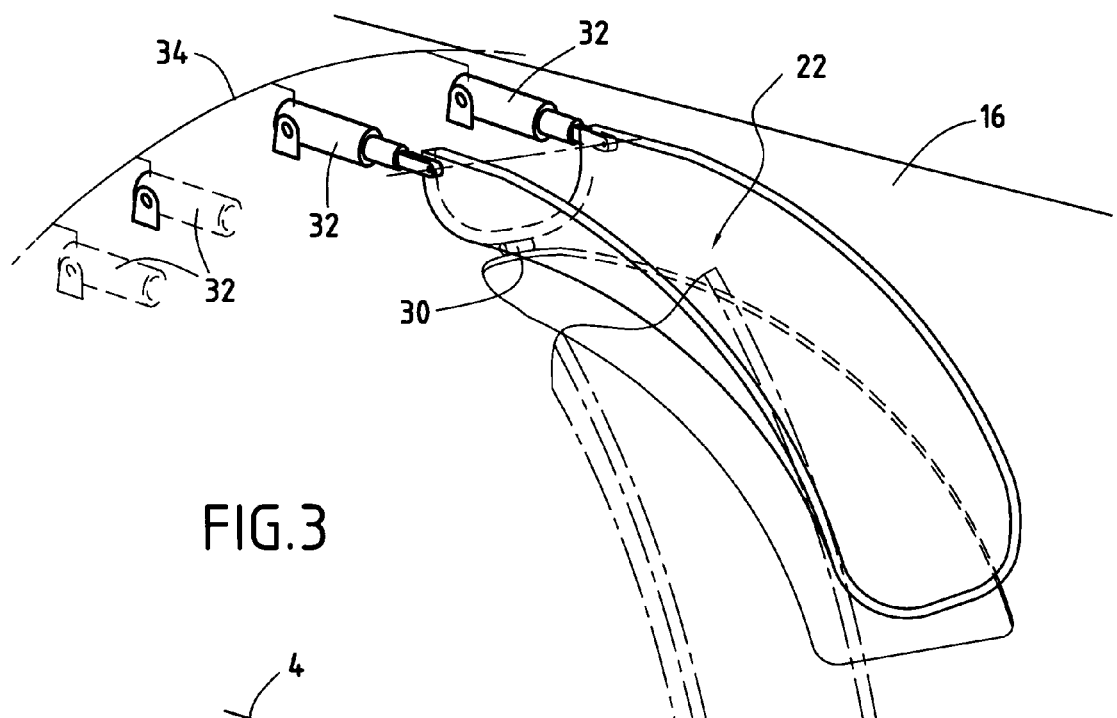
FIG. 3 is a fragmentary perspective view of the FIG. 1 mixer in its deployed position.

The lobes 22 are hinged to the nozzle 16 at their upstream ends via pivots 30, and they are moved into their two positions by means of at least one actuator 32 (e.g. a hydraulic, pneumatic, or electrical actuator). As shown in FIG. 3, the displacement of the lobes can be synchronized, e.g. by means of a synchronization cable 34 interconnecting all of the actuators 32.

Furthermore, the lobes 22 present azimuth components that are all in the same direction. A lobe is said to have an azimuth component when the lobe is curved so that its downstream end departs from the radial plane in which the lobe pivots.

Figure 5:
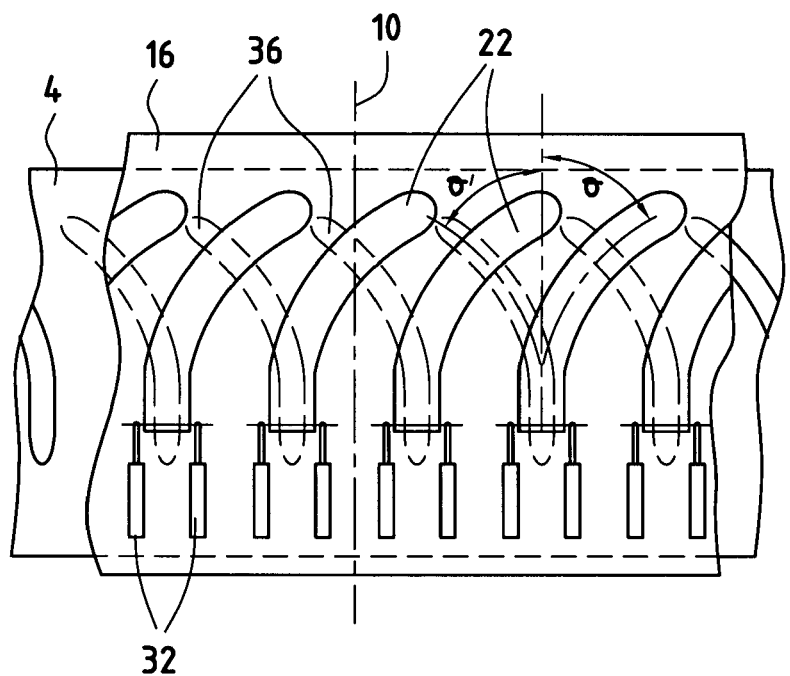
FIG. 5 is a developed view of the lobes and the grooves of the mixer of FIGS. 1 to 4.

As shown in FIG. 5, in a developed view, each lobe 22 presents over the nozzle 16 the same variable inclination θ relative to the longitudinal axis 10. As an indication, the inclination θ may reach as much as about 20°.

Naturally, the openings 20 in the nozzle 16 in which the lobes 22 are mounted are themselves complementary in shape to the projection of the lobes, i.e. the projection of each lobe onto the nozzle likewise presents an inclination relative to the longitudinal axis 10.

Furthermore, the azimuth component is directed in the same direction for each of the lobes 22. The lobes are thus all "twisted" in the same direction so as to impart gyratory movement to the external air admitted into the convergence zone 18 when the lobes are in the deployed position.

According to the invention, the mixer also has a plurality of longitudinal grooves (or depressions) 36 that extend over at least a portion of the central body 4, the grooves all presenting the same azimuth component in the same direction that is opposite to the direction of the azimuth component of the lobes.

Thus, in the developed view of FIG. 5, each groove 36 can be seen as presenting over the nozzle 16 the same variable inclination θ' relative to the longitudinal axis 10, this inclination θ' being in the opposite direction to the inclination θ of the lobes 22, and preferably being identical (in absolute value) to said inclination θ.

The central body 4 preferably presents as many grooves 36 as there are lobes 22. Thus, in the embodiment of FIG. 6, the mixer has sixteen lobes and sixteen grooves. The grooves 36 extend longitudinally over at least a portion of the central body.

Figure 4:
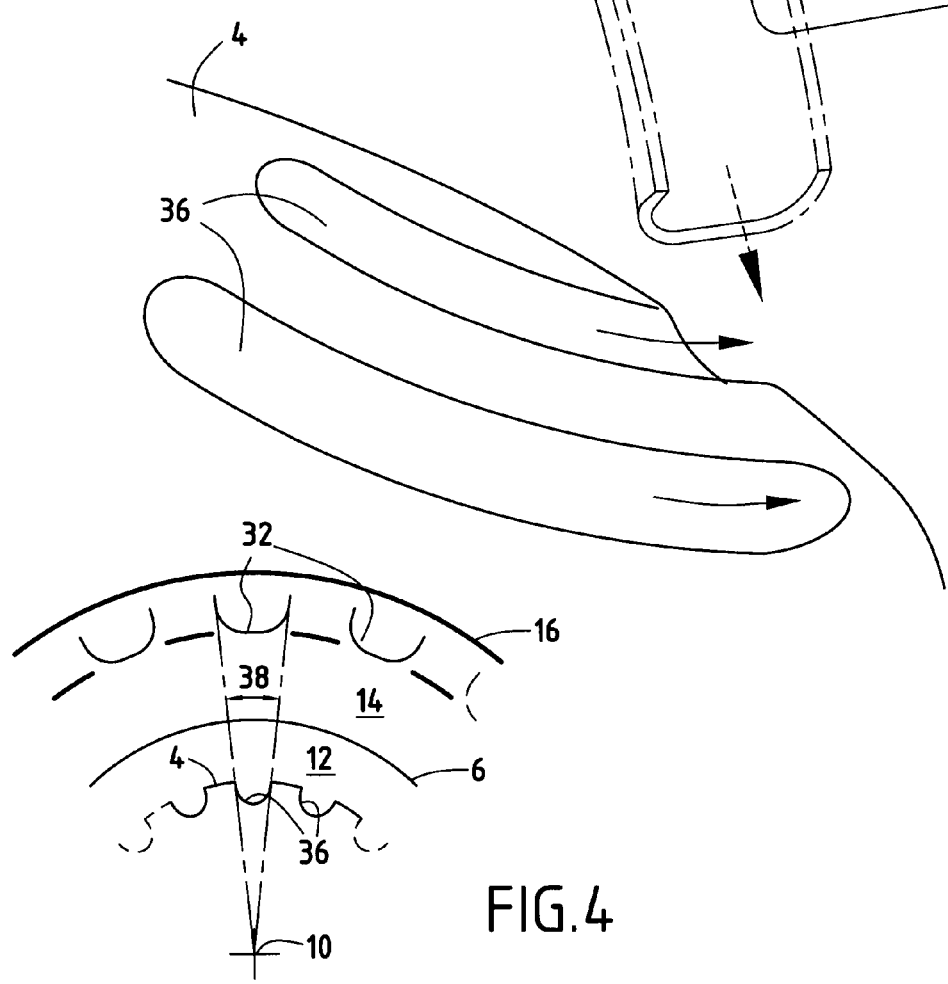
FIG. 4 is a section view on IV-IV of FIG. 1.

In addition, as shown in FIG. 4, each groove 36 presents a width that is substantially equivalent to the width of the lobes 22. More precisely, each groove 36 is preferably inscribed in the angular opening 38 in which the corresponding lobe 22 is inscribed.

Figure 6:
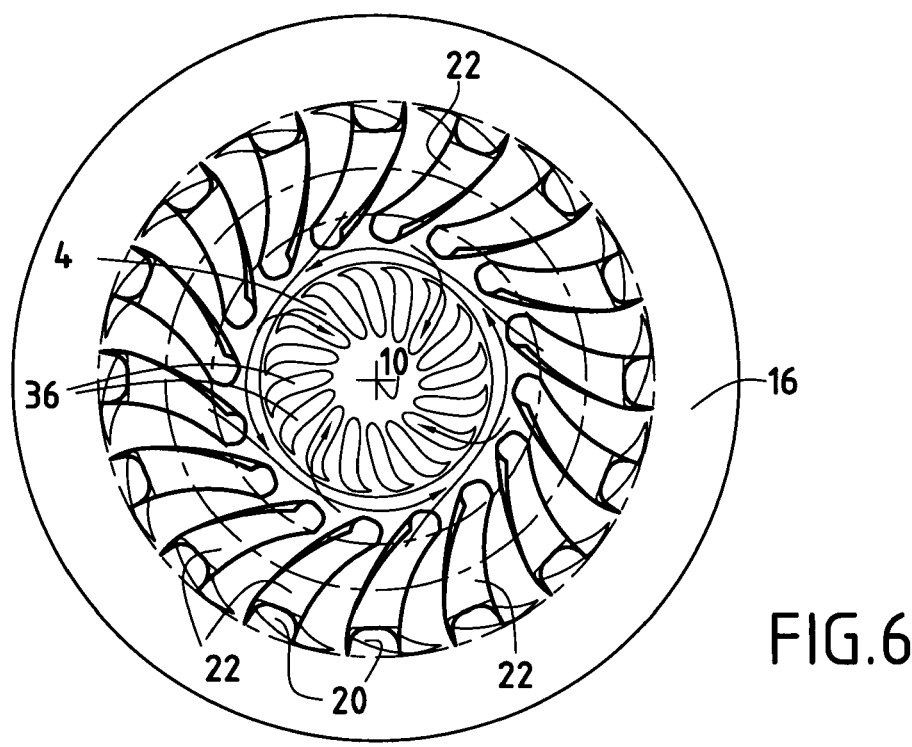
FIG. 6 is an end view of the FIG. 2 mixer.

As shown in FIG. 6, the presence of the grooves 36 in the central body 4 of the mixer enables the gaseous mixture coming from the cold and hot flows of the groove to have gyratory motion imparted thereto in a direction that is opposite to the gyratory motion of the external air admitted into the nozzle by the lobes 22. This results in better mixing between firstly the cold and hot flows and secondly the external air admitted by the lobes. This reduces the jet noise from the groove on takeoff. In addition, the presence of this gyratory motion of the mixture between the cold and hot flows serves to "straighten out" the flow of external air that is set into gyration by the lobes causing it to swirl in the opposite direction. As a result, the thrust from the turbojet is not diminished by the particular shape of the lobes.

What is claimed is:

1. A variable-section flow mixer for a double-flow turbojet for a supersonic airplane, the mixer comprising:
   a central annular body about a longitudinal axis;
   a primary annular cover coaxially surrounding the central body to co-operate therewith to define a primary annular channel;
   a secondary annular cover coaxially surrounding the primary cover to co-operate therewith to define a secondary annular channel coaxial with the primary channel; and
   an annular nozzle centered on the longitudinal axis and placed longitudinally in line with the secondary cover, the nozzle including a plurality of external-air admission openings distributed around its entire circumference, opening out into a convergence zone between the flows coming from the primary and secondary channels, and within which lobes are mounted that are movable between two different positions: a closed position in which they obstruct the nozzle openings; and a deployed position in which they disengage said openings and deploy radially into the nozzle so as to enable external air to be admitted into the convergence zone; the lobes all presenting a common azimuth component in a common direction so as to impart gyratory motion to the external air that is admitted into the convergence zone when the lobes are in the second position;
   the mixer further including a plurality of longitudinal grooves occupying at least a portion of the central body, the grooves all presenting a common azimuth component in a common direction that is opposite to the direction of the azimuth component of the lobes.

2. A mixer according to claim 1, wherein the number of grooves is the same as the number of lobes.

3. A mixer according to claim 1, wherein the azimuth component of the grooves is identical in magnitude to that of the lobes.

4. A turbojet for a supersonic airplane, the turbojet including a variable-section flow mixer according to claim 1.

5. A mixer according to claim 1, wherein the openings are complementary to a shape of a projection of the lobes.

6. A mixer according to claim 1, further comprising:
   a scoop mounted at each of the openings which pivots around a stationary pivot; and
   a link which connects the scoop to the lobe,
   wherein the scoop pivots together with the lobe in the deployed position to enable the external air to enter the convergence zone, and
   wherein the scoop covers the opening when the lobe is in the closed position.

* * * * *